US008740178B2

(12) United States Patent
Karl et al.

(10) Patent No.: US 8,740,178 B2
(45) Date of Patent: Jun. 3, 2014

(54) SOLENOID VALVE FOR CONTROLLING A FLUID

(75) Inventors: Andreas Karl, Benningen/Neckar (DE);
Massimiliano Ambrosi, Marbach (DE);
Nicolas Houis, Bietigheim-Bissingen (DE); Jens Norberg, Remseck (DE);
Stephan Steingass, Bornheim (DE);
Elmar Vier, Freiberg A. N. (DE);
Andreas Lechler, Vaihingen/Enz (DE);
Gerhard Stokmaier, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 13/040,562

(22) Filed: Mar. 4, 2011

(65) Prior Publication Data
US 2011/0215270 A1 Sep. 8, 2011

(30) Foreign Application Priority Data

Mar. 5, 2010 (DE) .................. 10 2010 002 602

(51) Int. Cl.
*F16K 31/02* (2006.01)

(52) U.S. Cl.
USPC .............. 251/54; 251/129.07; 303/119.2; 335/277; 335/279

(58) Field of Classification Search
USPC ............ 251/129.02, 129.15, 54, 129.07; 303/119.2; 335/279, 277
See application file for complete search history.

(56) References Cited

U.S. PATENT DOCUMENTS

| 5,496,100 | A | * | 3/1996 | Schmid | 303/119.2 |
| 5,605,386 | A | * | 2/1997 | Ziegler et al. | 303/119.2 |
| 5,683,151 | A | * | 11/1997 | Friedow et al. | 303/119.2 |
| 5,791,747 | A | * | 8/1998 | Sorensen et al. | 251/129.15 |
| 5,879,060 | A | * | 3/1999 | Megerle et al. | 303/119.2 |
| 6,238,014 | B1 | * | 5/2001 | Tamai et al. | 303/119.2 |
| 6,598,944 | B1 | * | 7/2003 | Wolff et al. | 303/119.2 |
| 6,739,571 | B2 | * | 5/2004 | Hironaka | 251/50 |
| 6,808,160 | B2 | * | 10/2004 | Hayakawa et al. | 251/129.02 |
| 7,243,899 | B2 | * | 7/2007 | Acar et al. | 251/129.07 |
| 2004/0026643 | A1 | | 2/2004 | Hayakawa et al. | |
| 2006/0027774 | A1 | | 2/2006 | Acar et al. | |

FOREIGN PATENT DOCUMENTS

| CN | 1762746 A | 4/2006 |
| DE | 102004038899 | 2/2006 |

\* cited by examiner

*Primary Examiner* — John Bastianelli
(74) *Attorney, Agent, or Firm* — Maginot, Moore & Beck

(57) ABSTRACT

A solenoid valve for controlling a fluid includes an armature having a base region, a lateral region and a head region. The solenoid valve includes a valve member connected to the armature. The solenoid valve further includes an armature casing component in which the armature is positioned. A flow path is formed between the armature and the armature casing component, the flow path extending from a lower armature space to an upper armature space and back to the lower armature space. A junction region is arranged between the head region and the lateral region. The junction region has at least one groove formed therein to facilitate an overflow between the lateral region and the head region.

11 Claims, 4 Drawing Sheets

US 8,740,178 B2

SOLENOID VALVE FOR CONTROLLING A FLUID

This application claims priority under 35 U.S.C. §119 to German patent application no. 10 2010 002 602.6, filed Mar. 5, 2010 in Germany, the disclosure of which is incorporated herein by reference in its entirety.

The present disclosure relates to a solenoid valve for controlling a fluid.

BACKGROUND

Solenoid valves of this type for controlling a fluid are known from the prior art in different embodiments, in particular for example as outlet valves for ABS/TCS/ESP devices in motor vehicles. These solenoid valves have an armature which is arranged in an axially movable fashion in a valve casing. A relatively large gap, which permits fluid to flow between a lower armature space and an upper armature space when the solenoid valve is actuated, is provided here between the armature and the valve casing. However, the large gap results in a significant adverse effect on the electromagnetic functionality of the solenoid valve.

SUMMARY

The solenoid valve according to the disclosure for controlling a fluid having the features set forth herein has, in contrast, the advantage that the flow through the armature space is significantly improved by virtue of the shape of the armature. This is achieved according to the disclosure in that the solenoid valve for controlling a fluid comprises an armature with a base region, a lateral region and a head region, a valve member which is connected to the armature, and an armature casing component. A flow path, which extends from a lower armature space to an upper armature space and back to the lower armature space, is formed here between the armature and the armature casing component, wherein a junction region, in which at least one groove is formed in order to improve an overflow between the lateral region and the head region, is arranged on the armature between the head region and the lateral region. As a result, a relatively large inlet cross section in the lateral region is also made available at the head region, which inlet cross section permits an improved discharge flow out of the upper armature space into the lateral region of the armature. In addition, a narrower gap can be provided between the armature and the valve casing, and this significantly improves the magnetic characteristic curve and the hydraulic damping behavior of the solenoid valve, and ensures operationally reliable functioning of the solenoid valve.

The preferred developments of the solenoid valve are set forth herein.

According to one preferred embodiment of the disclosure, a second groove, which lies opposite the first groove on the circumference of the armature, is arranged at the junction region. As a result, the effective flow cross sections are further significantly enlarged and a better flow through the armature space is made possible.

Furthermore, the groove is arranged at an angle from 20° to 30° with respect to the lateral region. Owing to this angle of inclination, local flow rates, as well as separation regions and vortex regions are generated in the upper armature space, which regions bring about a lasting improvement in the flow conditions around the armature, and consequently in the venting capability of the solenoid valve.

Each groove preferably opens in each case into a lateral groove which is formed in the lateral region. This gives rise to a continuous flow path through grooves between the upper and the lower armature spaces.

In a further advantageous embodiment of the disclosure, the lateral region has a flattened portion. It is further preferred for each groove to open into the flattened portion in each case. As a result, the flow path between the upper and lower armature space is significantly widened, which results in a reduction in the pressure prevailing in the flow path and the flow rate, thereby resulting in a low-resistance flow profile. In addition, the flattened portion can be manufactured easily, economically and with low complexity in respect of fabrication.

In a further advantageous embodiment of the disclosure, the armature has a bell shape with the head region, a first junction region, a first lateral region, a second junction region, a second lateral region and the base region, which bell shape favors an adjoining, low-resistance flow profile from the lower armature space to the upper armature space and back to the lower armature space. In addition, as a result the armature has a high degree of strength with a high low-temperature impact resistance.

According to one preferred embodiment of the disclosure, the groove has a V groove with a base region. This permits simple and cost-effective manufacture with precise angular orientation of the groove.

Furthermore, the armature casing component is in the shape of a pot. This implements a compact design with a low installation volume which facilitates mounting in the solenoid valve.

The armature is preferably of symmetrical design. As a result, the armature can be manufactured easily and cost-effectively and mounted without difficulty without orienting the sides.

BRIEF DESCRIPTION OF THE DRAWING

Exemplary embodiments of the disclosure are described below in detail with reference to the accompanying drawing, in which.

DETAILED DESCRIPTION

A solenoid valve for controlling a fluid according to a first preferred exemplary embodiment of the disclosure will be described below with reference to FIGS. 1 and 2.

Figure 1:
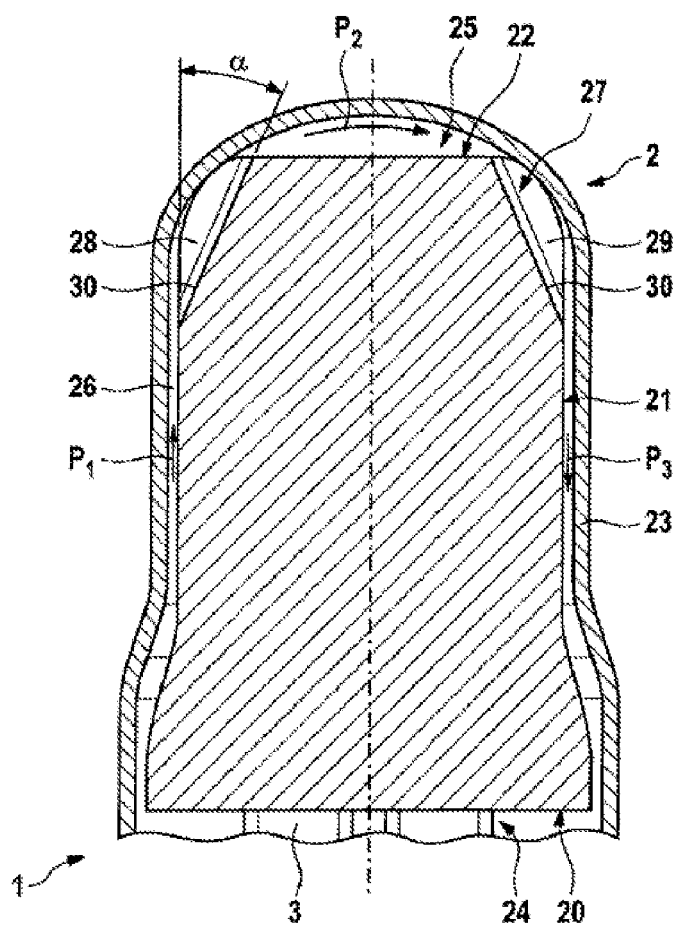
FIG. 1 shows a schematic sectional illustration of an armature of a solenoid valve controlling a fluid according to a first exemplary embodiment of the disclosure.

FIG. 1 shows a schematic sectional illustration of an armature 2 of a solenoid valve 1 for controlling a fluid according to the first exemplary embodiment of the disclosure.

As is apparent from FIG. 1, the armature comprises a base region 20, a lateral region 21 and a head region 22 and is connected to the base region 20 by a valve member 3 of the solenoid valve 1. The armature 2 is accommodated in a pot-shaped armature casing component 23. A flow path 26 is formed between the armature 2 and the armature casing component 23. A flow profile in the flow path 26 is characterized by arrows P1, P2 and P3 and runs from a lower armature space 24 to an upper armature space 25 and back to the lower armature space 24. A junction region 27, in which a first groove 28 and a second groove 29 arranged lying opposite is formed between the head region 22 and the lateral region 21 (FIG. 2). The grooves 28, 29 each run between the head region 22 and the lateral region 21. In addition, the grooves 28, 29 each have a V shape with a base region 30 which is arranged inclined at an angle α of approximately 20° to 30°, in particular of 22° to 28° or preferably precisely 25°, with respect to the lateral region 21. Owing to this angle of inclination, the local flow rate from the lateral region 21 to the head region 22 and back again in the lateral region 21 is improved, and separation regions and vortex regions are generated in the upper armature space 25, which regions bring about a lasting improvement in the flow conditions around the armature 2, and consequently in the venting capability of the entire armature space.

Figure 2:
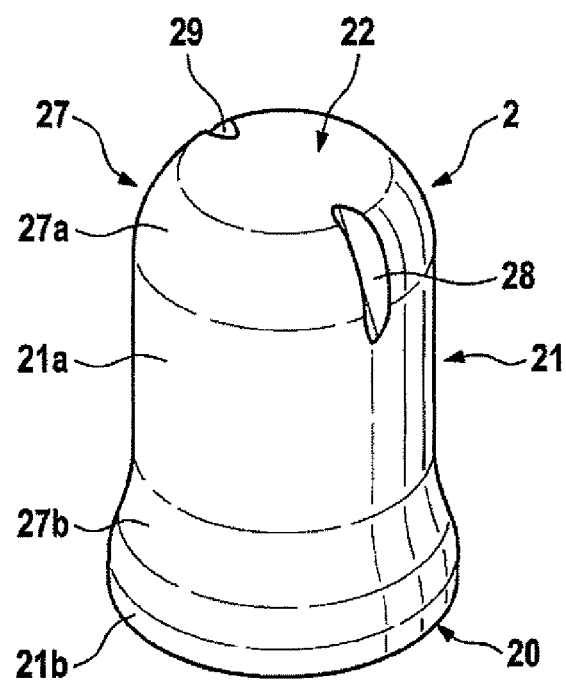
FIG. 2 shows a perspective illustration of the armature of the solenoid valve in FIG. 1.

As is apparent from FIG. 2, the armature 2 has a bell shape with the head region 22, a first junction region 27a, a first lateral region 21a, a second junction region 27b, a second lateral region 21b and the base region 20. This shape favors a low-resistance flow profile in the flow path 26 between the armature 2 and the armature casing component 23. In addition, this gives the armature 2 a particularly compact shape with minimized overall volume.

Figure 3:
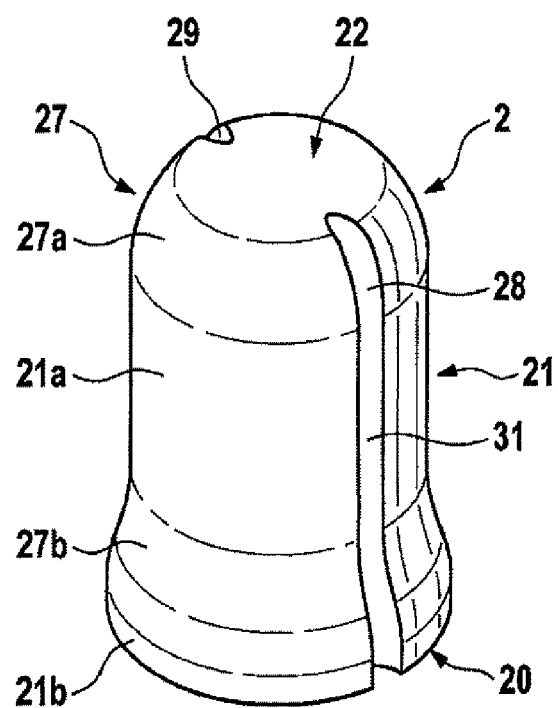
FIG. 3 shows a perspective illustration of the armature of the solenoid valve according to a second exemplary embodiment of the disclosure.

FIG. 3 shows a perspective illustration of the armature 2 of the solenoid valve 1 according to a second exemplary embodiment, wherein identical or functionally identical components are denoted by the same reference symbols as in the first exemplary embodiment. In contrast to the first exemplary embodiment, in this second exemplary embodiment the grooves 28, 29 each open into a lateral groove 31 formed in the lateral region 21, of which lateral grooves 31 only the one into which the groove 28 opens can be seen in FIG. 3. As a result, the flow path 26 is significantly widened between the armature casing component 23 (not illustrated here) and the armature 2, between the lower armature space 24 and the upper armature space 25, and a noticeably improved flow through the armature 2 is brought about since the main portion of the flow passes through the lateral groove 31.

Figure 4:
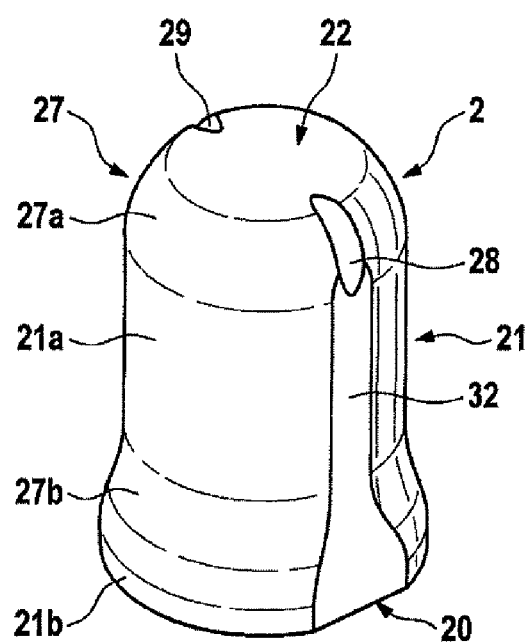
FIG. 4 shows a perspective illustration of the armature of the solenoid valve according to a third exemplary embodiment of the disclosure.

FIG. 4 shows a perspective illustration of the armature 2 of the solenoid valve 1 according to a third exemplary embodiment, wherein identical or functionally identical components are denoted by the same reference symbols as in the first and second exemplary embodiments. In this third exemplary embodiment, the lateral region 21 has in each case a flattened portion 32 into which the groove 28 or the groove 29 opens, wherein only the flattened portion 32 into which the groove 28 opens can be seen in this illustration. Each of the flattened portions 32 runs over the entire height of the lateral region 21 of the armature 2 here. As a result, the quantity of fluid which flows through the flow path is increased further.

The solenoid valve 1 in the previously described exemplary embodiments has the advantage that the magnetically effective flow cross sections and as a result the flow through the armature space as well as the venting capability of the solenoid valve 1 which is dependent thereon are significantly improved through corresponding shaping or an external shape of the armature 2. This brings about an improvement in the electromagnetic characteristic curve and the hydraulic damping of the solenoid valve 1, with the result that more precise functional accuracy of the solenoid valve 1 is ensured at all operating points.

What is claimed is:

1. A solenoid valve for controlling a fluid, comprising:
    an armature including a base region, a substantially cylindrical lateral region, a head region, and a junction region defined between the lateral region and the head region;
    a valve member connected to the armature;
    an armature casing component in which the armature is positioned; and
    only one groove arrangement including a first groove in the junction region configured to facilitate fluid flow between the lateral region and the head region, the only one groove arrangement defined only in the junction region, an outer portion of the head region, and an upper portion of the lateral region,
    wherein a flow path is formed between the armature and the armature casing component, the flow path extending from a lower armature space to an upper armature space and back to the lower armature space, and
    wherein the first groove is arranged at an angle of approximately 20° to 30° with respect to the lateral region.

2. The solenoid valve according to claim 1, wherein the armature casing component is in the shape of a pot.

3. The solenoid valve according to claim 1, wherein the junction region has a non-cylindrical shape.

4. The solenoid valve according to claim 1, wherein:
    the only one groove arrangement further comprises a second groove (i) defined only in the junction region, the outer portion of the head region, and the upper portion of the lateral region and (ii) configured to facilitate fluid flow between the lateral region and the head region, and
    wherein the second groove is located opposite the first groove on the circumference of the armature.

5. The solenoid valve according to claim 4, wherein the second groove is arranged at an angle of approximately 20° to 30° with respect to the lateral region.

6. The solenoid valve according to claim 5, wherein the armature is of symmetrical design.

7. The solenoid valve according to claim 5, wherein each of the first groove and the second groove is a linear V-shaped groove.

8. A solenoid valve for controlling a fluid, comprising:
    an armature including a base region, a substantially cylindrical lateral region, a head region, and a junction region defined between the lateral region and the head region;
    a valve member connected to the armature;
    an armature casing component in which the armature is positioned; and
    a first groove defined in the junction region and configured to facilitate fluid flow between the lateral region and the head region,
    wherein a flow path is formed between the armature and the armature casing component, the flow path extending from a lower armature space to an upper armature space and back to the lower armature space,
    wherein the lateral region includes a substantially cylindrical exterior surface having a first planar flattened portion (i) defined in an outer circumference of the substantially cylindrical exterior surface, (ii) extending in a first plane parallel to a longitudinal axis of the armature, and (iii) extending from the base region to the junction region such that the first groove opens into the first planar flattened portion.

9. The solenoid valve according to claim 1, wherein the armature possesses a bell shape defined by the head region, a first junction region, a first lateral region, a second junction region extending outwardly from the first lateral region, a second lateral region, which has a greater diameter than the first lateral region, and the base region.

10. The solenoid valve according to claim 8, further comprising:
 a second groove defined in the junction region and configured to facilitate fluid flow between the lateral region and the head region,
 wherein the substantially cylindrical exterior surface of the lateral region includes a second planar flattened portion (i) defined in the outer circumference of the substantially cylindrical exterior surface, (ii) extending in a second plane parallel to the longitudinal axis of the armature, and (iii) extending from the base region to the junction region such that the second groove opens into the second planar flattened portion.

11. The solenoid valve according to claim 10, wherein the first plane and the second plane are parallel to one another.

\* \* \* \* \*